(12) United States Patent
Schekulin et al.

(10) Patent No.: US 10,256,736 B2
(45) Date of Patent: Apr. 9, 2019

(54) DC-DC CONVERTER WITH POLARITY REVERSAL PROTECTION

(71) Applicant: Schmidhauser AG, Romanshorn (CH)

(72) Inventors: Dirk Schekulin, Wienacht-Tobel (CH); Silvia Gross, Romanshorn (CH); Chris Haertsch, Flawil (CH); Thomas Bisig, Romanshorn (CH); Alex Itten, Romanshorn (CH); Pierre Cavin, Weinfelden (CH)

(73) Assignee: Schmidhauser AG, Romanshorn (CH)

( * ) Notice: Subject to any disclaimer, the term of this patent is extended or adjusted under 35 U.S.C. 154(b) by 20 days.

(21) Appl. No.: 14/438,161

(22) PCT Filed: Oct. 23, 2013

(86) PCT No.: PCT/EP2013/072147
§ 371 (c)(1),
(2) Date: Apr. 23, 2015

(87) PCT Pub. No.: WO2014/064142
PCT Pub. Date: May 1, 2014

(65) Prior Publication Data
US 2015/0280589 A1 Oct. 1, 2015

(30) Foreign Application Priority Data
Oct. 23, 2012 (DE) .................. 10 2012 219 365

(51) Int. Cl.
*H02M 3/335* (2006.01)
*H02H 7/12* (2006.01)
(Continued)

(52) U.S. Cl.
CPC ...... *H02M 3/33546* (2013.01); *H02H 7/1213* (2013.01); *H02H 11/003* (2013.01); *H02M 3/33576* (2013.01); *H02M 1/32* (2013.01)

(58) Field of Classification Search
CPC ......... H02M 3/33507; H02M 3/33569; H02M 3/33576; H02M 3/33592; H02M 7/219;
(Continued)

(56) References Cited

U.S. PATENT DOCUMENTS

| 3,944,934 A * | 3/1976 | Francis, Jr. .......... G08B 29/185 327/174 |
| 4,660,133 A * | 4/1987 | Stasch ............... H02M 3/33569 323/266 |

(Continued)

FOREIGN PATENT DOCUMENTS

| CN | 1885701 A | 12/2006 |
| CN | 101228682 A | 7/2008 |

(Continued)

OTHER PUBLICATIONS

International Search Report (PCT/ISA/210) dated Mar. 24, 2014, with English translation (four (4) pages).
(Continued)

*Primary Examiner* — Yusef A Ahmed
(74) *Attorney, Agent, or Firm* — Crowell & Moring LLP

(57) ABSTRACT

A DC-DC converter includes a first half-bridge circuit, a second half-bridge circuit, at least one transformer having at least one primary winding and at least one secondary winding, wherein the first and second half-bridge circuits are designed to generate an AC voltage at the at least one primary winding, and a rectifier circuit having an output terminal. The output terminal includes a first output terminal pole and a second output terminal pole. The rectifier circuit includes at least one rectifier element. The rectifier circuit is designed to rectify a voltage present at the at least one secondary winding and to output it at the output terminal. The rectifier circuit includes a polarity reversal protection transistor, the collector-emitter path of which or the drain-source path of which is looped in between a terminal of the (Continued)

at least one rectifier element and the first or the second output terminal pole of the output terminal.

3 Claims, 4 Drawing Sheets

(51) Int. Cl.
*H02H 11/00* (2006.01)
*H02M 1/32* (2007.01)

(58) Field of Classification Search
CPC ......... H02M 7/5383; H02M 2001/0058; H02J 7/0034
See application file for complete search history.

(56) References Cited

U.S. PATENT DOCUMENTS

| | | | | |
|---|---|---|---|---|
| 5,442,534 | A * | 8/1995 | Cuk | H02M 3/005 363/16 |
| 5,684,683 | A * | 11/1997 | Divan | H02M 3/285 363/132 |
| 6,069,798 | A | 5/2000 | Liu | |
| 6,128,206 | A * | 10/2000 | Sun | H02M 3/33592 363/127 |
| 6,239,989 | B1 * | 5/2001 | Ming-Ching | H02M 3/33576 363/20 |
| 6,320,764 | B1 * | 11/2001 | Jiang | H02M 3/33523 323/255 |
| 6,882,548 | B1 * | 4/2005 | Jacobs | H02M 1/34 363/127 |
| 7,388,761 | B1 * | 6/2008 | Wang | H02M 3/33576 363/17 |
| 8,107,261 | B2 * | 1/2012 | Cesnak | H02M 1/14 363/17 |
| 9,602,008 | B1 * | 3/2017 | Tomita | H02M 3/33507 |
| 9,712,062 | B2 * | 7/2017 | Herbert | H02M 3/33546 |
| 2001/0026462 | A1 * | 10/2001 | Tokunaga | H02M 3/33592 363/97 |
| 2001/0030879 | A1 * | 10/2001 | Greenfeld | H02M 1/38 363/17 |
| 2002/0064058 | A1 * | 5/2002 | Zhang | H02M 1/10 363/17 |
| 2002/0064059 | A1 * | 5/2002 | Ying | H02M 3/33576 363/17 |
| 2002/0122321 | A1 * | 9/2002 | Chapuis | H02M 3/33592 363/24 |
| 2006/0181230 | A1 * | 8/2006 | Hosotani | H02M 3/33569 318/136 |
| 2009/0290384 | A1 * | 11/2009 | Jungreis | H02M 1/4241 363/17 |
| 2010/0052423 | A1 * | 3/2010 | Shimada | H02M 3/33507 307/43 |
| 2010/0109571 | A1 * | 5/2010 | Nishino | H02M 1/4208 315/307 |
| 2010/0118459 | A1 * | 5/2010 | Logiudice | H02H 11/003 361/84 |
| 2010/0128498 | A1 * | 5/2010 | Nymand | H02M 3/335 363/17 |
| 2011/0019439 | A1 * | 1/2011 | Lee | H02M 3/33569 363/16 |
| 2011/0025281 | A1 * | 2/2011 | Cross | H02M 1/36 323/282 |
| 2011/0038181 | A1 * | 2/2011 | Yan | H02M 1/32 363/17 |
| 2011/0069514 | A1 * | 3/2011 | Chiba | H02M 3/33569 363/21.02 |
| 2011/0260631 | A1 * | 10/2011 | Park | H05B 33/0815 315/165 |
| 2012/0038227 | A1 * | 2/2012 | West | H01H 9/541 307/139 |
| 2012/0063177 | A1 * | 3/2012 | Garrity | H02J 3/383 363/37 |
| 2012/0087154 | A1 * | 4/2012 | Maisel | H02J 7/0034 363/19 |
| 2012/0300501 | A1 * | 11/2012 | Kojima | H02M 3/33576 363/17 |
| 2013/0016534 | A1 * | 1/2013 | Ishikura | H02M 3/337 363/21.02 |
| 2013/0033904 | A1 * | 2/2013 | Ye | H02M 3/33576 363/17 |
| 2013/0135904 | A1 * | 5/2013 | Murayama | H02M 3/33561 363/17 |
| 2013/0229738 | A1 | 9/2013 | Gueltig | |
| 2013/0250626 | A1 * | 9/2013 | Hosotani | H02M 3/33553 363/21.02 |
| 2013/0320755 | A1 * | 12/2013 | Peuser | B60L 3/0046 307/10.1 |
| 2014/0092640 | A1 * | 4/2014 | Yamashita | H02M 1/4225 363/17 |
| 2014/0112026 | A1 * | 4/2014 | Pan | H02M 3/07 363/21.02 |
| 2014/0126247 | A1 * | 5/2014 | Koch | H02M 1/34 363/21.14 |
| 2014/0313801 | A1 * | 10/2014 | Turki | H02M 7/217 363/126 |
| 2014/0368167 | A1 * | 12/2014 | Okura | H02J 5/005 320/109 |
| 2015/0115824 | A1 * | 4/2015 | Lee | H05B 33/0809 315/206 |
| 2015/0288169 | A1 * | 10/2015 | Schinzel | H02M 1/32 361/78 |
| 2015/0326132 | A1 * | 11/2015 | Herbert | H02M 3/33546 363/21.04 |
| 2016/0006357 | A1 * | 1/2016 | Chen | H02M 3/335 363/21.12 |
| 2016/0105119 | A1 * | 4/2016 | Akamatsu | H02M 7/4807 363/21.04 |
| 2016/0190934 | A1 * | 6/2016 | Hung | H02M 3/33507 363/21.01 |
| 2016/0301315 | A1 * | 10/2016 | Pan | H02M 3/33523 |

FOREIGN PATENT DOCUMENTS

| | | |
|---|---|---|
| DE | 39 30 091 A1 | 3/1991 |
| DE | 202 21 373 U1 | 9/2005 |
| DE | 10 2009 006 665 A1 | 8/2010 |
| DE | 20 2010 016 526 U1 | 5/2011 |
| DE | 10 2011 003 764 A1 | 8/2012 |

OTHER PUBLICATIONS

Shameem, "Reverse Battery Charger Protection" maxim integrated, Feb. 16, 2011, three pages, XP055453894, https://pdfserv.maximintegrated.com/en/an/AN4572.pdf.

Anonymous, "Reverse polarity protection curcuit for 12 Volt", Nov. 11, 2008, two pages, XP055453895, http://www.edaboard.com/showthread.php?t=137840.

* cited by examiner

DC-DC CONVERTER WITH POLARITY REVERSAL PROTECTION

This application is a National Stage of PCT International Application No. PCT/EP2013/072147, filed Oct. 23, 2013, which claims priority under 35 U.S.C. § 119 from German Patent Application No. 10 2012 219 365.0, filed Oct. 23, 2012, the entire disclosures of which are herein expressly incorporated by reference.

BACKGROUND AND SUMMARY OF THE INVENTION

Various topologies are known for DC-DC converters (also designated as DC choppers) for high output currents. Use is often made of full-bridge circuits having a split winding on the output side or a current doubler circuit.

With the use of intermediate circuit voltages of up to 850 V, IGBTs (insulated-gate bipolar transistors) having a dielectric strength of 1200 V are preferably used, which leads to a significant upward limitation of the switching frequency, as a result of which relatively large inductive components become necessary.

DE 202 21 373 U1 discloses a circuit in which two asymmetrical half-bridges operate on a split primary winding of a transformer. This enables the use of MOSFETs as switching elements, as a result of which the switching frequency can be considerably increased. On the output side, said circuit operates with a current doubler circuit. In order to control reverse current effects of the diodes, additional saturable reactors are necessary.

In the case of the circuit disclosed in DE 202 21 373 U1, polarity reversal of the output terminals, for example upon connection of a battery, inevitably leads to high currents and thus to the destruction of the rectifier diodes. A high current loading of the windings of the transformer furthermore results on account of the current doubler circuit.

The invention is based on the object of providing a DC-DC converter which enables the use of MOSFETs as switching elements and at the same time ensures a reliable polarity reversal protection and/or has a low current loading of the windings of the transformer.

The invention achieves this object by means of a DC-DC converter. The DC-DC converter comprises a first, in particular asymmetrical, half-bridge circuit and a second, in particular asymmetrical, half-bridge circuit.

Furthermore, at least one, in particular galvanically isolating, transformer is provided, comprising at least one primary winding and at least one secondary winding. The first and second half-bridge circuits are designed to generate an AC voltage at the at least one primary winding.

A rectifier circuit of the DC-DC converter comprises an output terminal, wherein the output terminal comprises a first output terminal pole or a first output terminal and a second output terminal pole or a second output terminal, and at least one rectifier element, wherein the rectifier circuit is designed to rectify a voltage present at the at least one secondary winding and to output it in a rectified fashion at the output terminal.

The rectifier circuit comprises a polarity reversal protection transistor, the collector-emitter path of which or the drain-source path of which is looped in between a terminal of the at least one rectifier element and the first or the second output terminal pole of the output terminal.

The polarity reversal protection transistor ensures a reliable polarity reversal protection, such that, for example, polarity reversal of the output terminal poles upon connection of a battery does not lead to destruction of the rectifier elements.

The DC-DC converter can comprise exactly one transformer, wherein the transformer comprises exactly two primary windings and exactly two secondary windings.

The first half-bridge circuit can be designed to generate an AC voltage at the first primary winding, and the second half-bridge circuit can be designed to generate an AC voltage at the second primary winding.

The rectifier circuit can comprise exactly two rectifier elements in the form of a first diode and a second diode, wherein a first terminal of the first secondary winding is electrically connected to the anode of the first diode, and the drain-source path of the MOSFET polarity reversal protection transistor and an inductor (in any order) are looped in between the cathode of the first diode and the first output terminal pole of the output terminal.

A first terminal of the second secondary winding can be electrically connected to the anode of the second diode, the cathode of the first diode and the cathode of the second diode can be electrically connected, and the second terminal of the first secondary winding, the second terminal of the second secondary winding and the second output terminal pole of the output terminal can be electrically connected.

The DC-DC converter can comprise exactly two, for example magnetically coupled, transformers, wherein the two transformers each comprise exactly one primary winding and exactly one secondary winding. The first half-bridge circuit can be designed to generate an AC voltage at the primary winding of the first transformer, and the second half-bridge circuit can be designed to generate an AC voltage at the primary winding of the second transformer. The rectifier circuit can comprise a first pair of rectifier elements in the form of a first diode and a second diode and comprise a second pair of rectifier elements in the form of a third diode and a fourth diode. A first terminal of the secondary winding of the first transformer can be electrically connected to the anode of the first diode, a first terminal of the secondary winding of the second transformer can be electrically connected to the anode of the third diode, the cathodes of the first to fourth diodes can be electrically connected, and the drain-source path of the MOSFET polarity reversal protection transistor and an inductor (in any order) can be looped in between the cathodes of the first to fourth diodes and the first output terminal pole of the output terminal.

A second terminal of the secondary winding of the first transformer, a second terminal of the secondary winding of the second transformer, the anodes of the second diode and of the fourth diode and the second output terminal pole of the output terminal can be electrically connected.

The DC-DC converter can comprise exactly one transformer, wherein the transformer comprises exactly two primary windings and exactly one secondary windings. The first half-bridge circuit can be designed to generate an AC voltage at the first primary winding, and the second half-bridge circuit can be designed to generate an AC voltage at the second primary winding. The rectifier circuit can comprise two rectifier elements in the form of a first diode and a second diode, wherein a first terminal of the secondary winding is electrically connected to the cathode of the first diode, the anode of the first diode is electrically connected to the anode of the second diode, the cathode of the second diode is electrically connected to a second terminal of the secondary winding, and the drain-source path of the polarity reversal protection transistor is looped in between the anodes of the first and second diodes and the second output terminal pole of the output terminal.

A first inductor can be looped in between the first terminal of the secondary winding and the first output terminal pole of the output terminal, and a second inductor can be looped in between the second terminal of the second secondary winding and the first output terminal pole of the output terminal.

MOSFETs (metal oxide semiconductor field effect transistors) can be used as respective switching means in the first and second half-bridge circuits.

All the rectifier elements and the polarity reversal protection transistor can be integrated into a power module.

BRIEF DESCRIPTION OF THE DRAWINGS

The invention is described below with reference to the drawings, in which schematically.

DETAILED DESCRIPTION OF THE DRAWINGS

Figure 1:
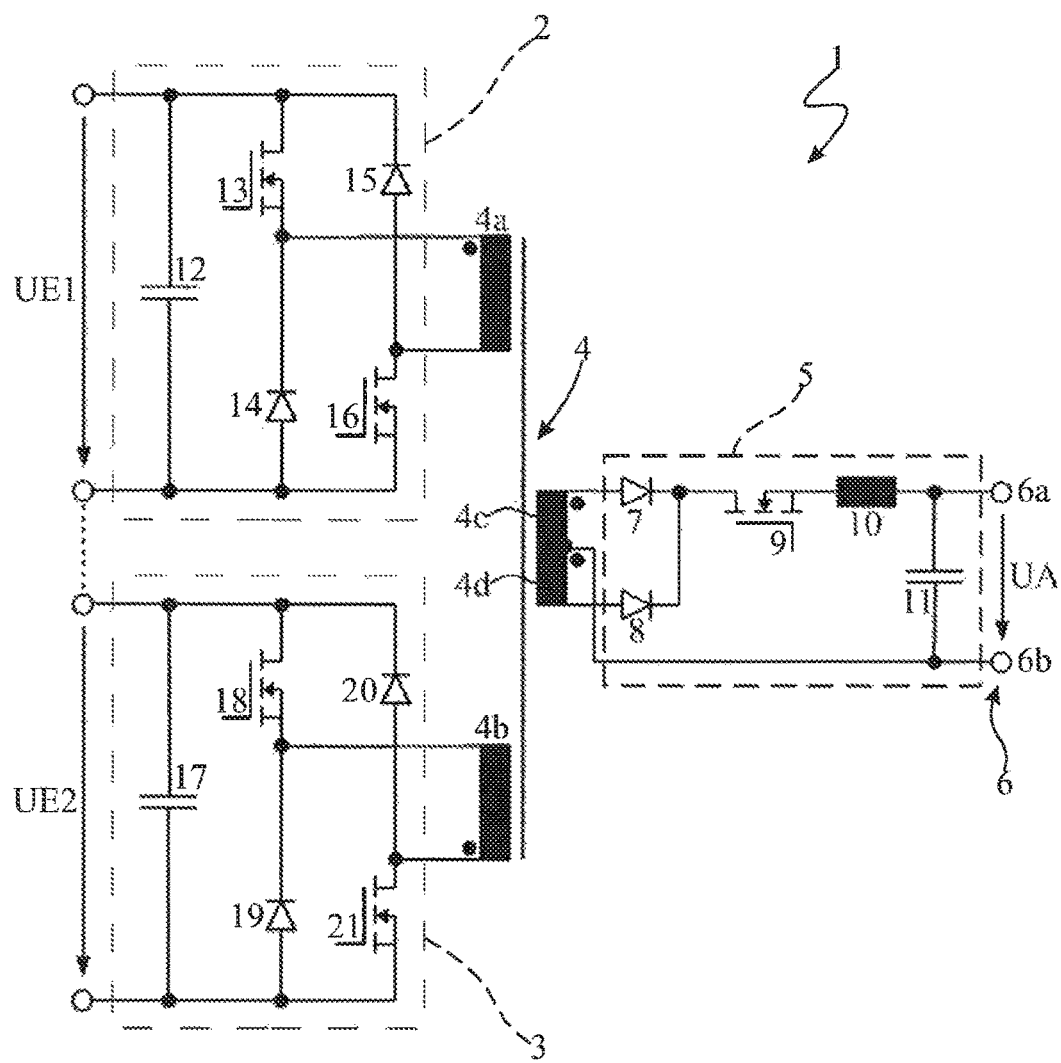
FIG. 1 shows a DC-DC converter in the form of a push-pull forward converter comprising two asymmetrical half-bridges connected in series or in parallel, a transformer comprising 2 primary and 2 secondary windings and polarity reversal protection on the output side.

FIG. 1 shows a DC-DC converter 1 comprising a first asymmetrical half-bridge circuit 2, a second asymmetrical half-bridge circuit 3, a transformer 4 comprising two primary windings 4a, 4b and two secondary windings 4c, 4d, and a rectifier circuit 5 with polarity reversal protection.

The first half-bridge circuit 2 is designed to generate an AC voltage at the first primary winding 4a, and the second half-bridge circuit 3 is designed to generate an AC voltage at the second primary winding 4b.

The first half-bridge circuit 2 comprises an input capacitor 12, which buffers an input DC voltage UE1 applied to input terminals of the half-bridge circuit 2. A first MOFSET 13 and a first diode 14 in series are looped in between the input terminals. Furthermore, a second diode 15 and a second MOSFET 16 in series are looped in between the input terminals. The first primary winding 4a is looped in between a connecting node of the first MOSFET 13 and the cathode of the first diode 14 and a connecting node of the anode of the second diode 15 and the second MOSFET 16.

The second half-bridge circuit 3 is topologically constructed in a corresponding fashion and comprises an input capacitor 17, which buffers an input DC voltage UE2 (wherein UE1 and UE2 can be identical or different) applied to input terminals of the half-bridge circuit 3. A third MOSFET 18 and a third diode 19 in series are looped in between the input terminals. Furthermore, a fourth diode 20 and a fourth MOSFET in series are looped in between the input terminals. The second primary winding 4b is looped in between a connecting node of the third MOSFET 18 and the cathode of the third diode 19 and a connecting node of the anode of the fourth diode 20 and the fourth MOSFET 21.

The rectifier circuit 5 serves to rectify AC voltages present at the secondary windings 4c and 4d and to output them as rectified output DC voltage UA at an output terminal 6 comprising a first and a second output terminal pole 6a, 6b. A potential output at the output terminal pole 6a can be greater than a potential output at the output terminal pole 6b.

For the purpose of voltage rectification, the rectifier circuit 5 comprises two rectifier elements in the form of a first diode 7 and a second diode 8, wherein a first terminal of the first secondary winding 4c is electrically connected to the anode of the first diode 7, a first terminal of the second secondary winding 4d is electrically connected to the anode of the second diode 8, the cathode of the first diode 7 and the cathode of the second diode 8 are electrically connected, and the second terminal of the first secondary winding 4c, the second terminal of the second secondary winding 4d (wherein the second terminals of the secondary windings 4c and 4d can form a common transformer center tap) and the second output terminal pole 6b of the output terminal 6 are electrically connected.

The drain-source path of a MOSFET polarity reversal protection transistor 9 and an inductor 10 in any order are looped in between the cathodes of the diodes 7 and 8 and the first output terminal pole 6a of the output terminal 6.

The MOSFET polarity reversal protection transistor 9 should be interconnected in such a way that it effectively blocks a polarity-reversed voltage. With the use of N-channel MOSFET polarity reversal protection transistors, this means that the source terminal faces in the direction of the positive terminal 6a and the drain terminal faces in the direction of the rectifier elements or rectifier diodes 7 and 8.

It goes without saying that the MOSFET polarity reversal protection transistor 9 can also be "shifted through" and arranged in the negative line. For this case, the drain terminal faces in the direction of the negative terminal 6b and the source terminal faces in the direction of the transformer center tap.

A positive voltage, for example 12 V, between gate terminal and source terminal switches on the MOSFET polarity reversal protection transistor 9 and a voltage of 0 V between gate terminal and source terminal turns off the MOSFET polarity reversal protection transistor 9, i.e. the voltage at the gate terminal should be chosen suitably depending on the interconnection of the MOSFET polarity reversal protection transistor 9.

A capacitor 11 serves for buffering the output DC voltage UA.

Figure 2:
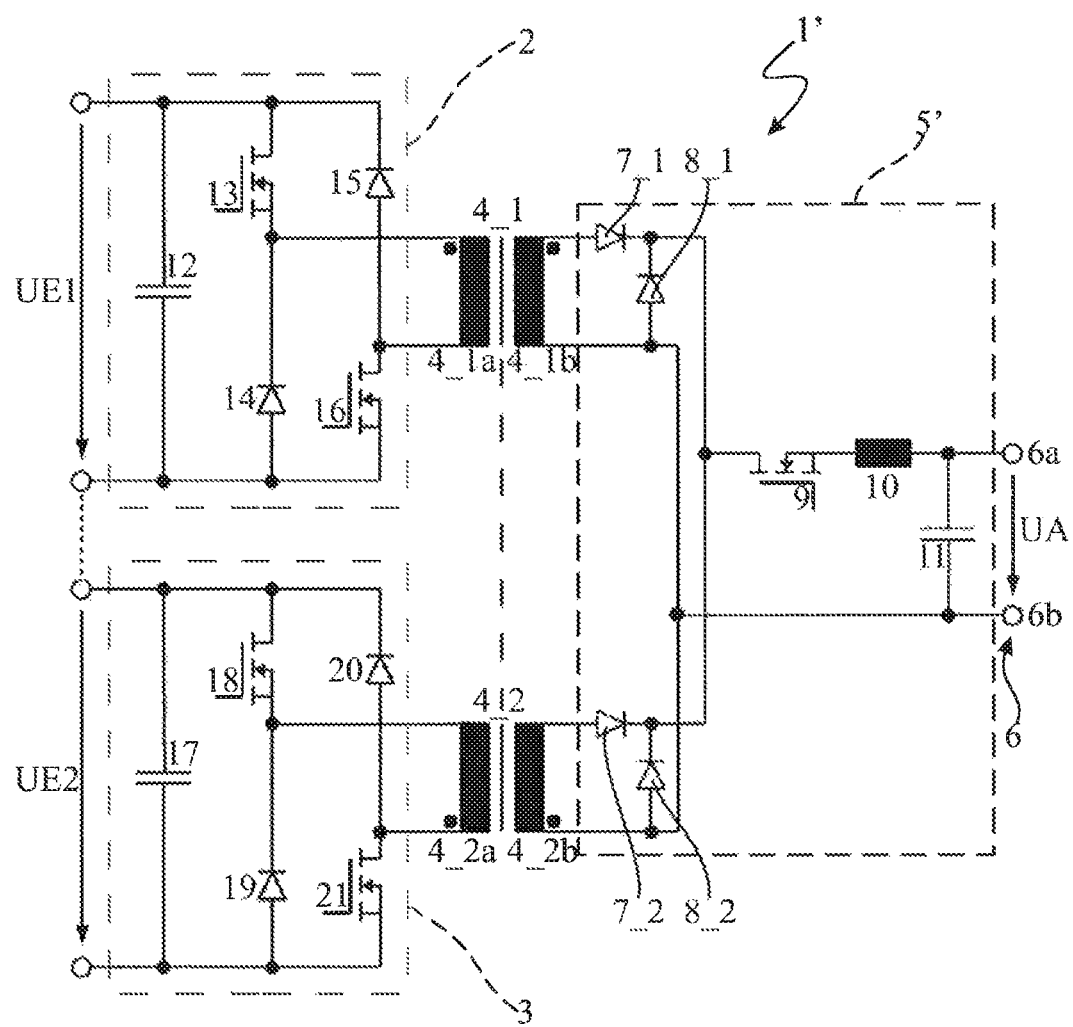
FIG. 2 shows a DC-DC converter in the form of a push-pull forward converter comprising two asymmetrical half-bridges connected in series or in parallel, two transformers (optionally magnetically coupled) each comprising an individual primary winding and secondary winding and polarity reversal protection on the output side.

FIG. 2 shows a DC-DC converter 1' in the form of a push-pull forward converter comprising two optionally magnetically coupled transformers 4_1 and 4_2 each comprising an individual primary winding 4_1a and 4_2a, respectively, and each comprising an individual secondary winding 4_1b and 4_2b, respectively, and polarity reversal protection on the output side.

The half-bridge circuits 2 and 3 correspond to those from FIG. 1.

A rectifier circuit 5' comprises a first pair of rectifier elements in the form of a first diode 7_1 and a second diode 8_1 and a second pair of rectifier elements in the form of a third diode 7_2 and a fourth diode 8_2.

A first terminal of the secondary winding 4_1b of the first transformer 4_1 is electrically connected to the anode of the first diode 7_1, a first terminal of the secondary winding 4_2b of the second transformer 4_2 is electrically connected to the anode of the third diode 7_2, the cathodes of the first to fourth diodes 7_1, 7_2, 8_1, 8_2 are electrically connected, and the drain-source path of the MOSFET polarity reversal protection transistor 9 and the inductor 10 in any order are looped in between the cathodes of the first to fourth diodes 7_1, 7_2, 8_1, 8_2 and the first output terminal pole 6a of the output terminal 6.

A second terminal of the secondary winding 4_1b of the first transformer 4_1, a second terminal of the secondary winding 4_2b of the second transformer 4_2, the anodes of the second diode 8_1 and of the fourth diode 8_2 and the second output terminal pole 6b of the output terminal 6 are electrically connected.

Figure 3:
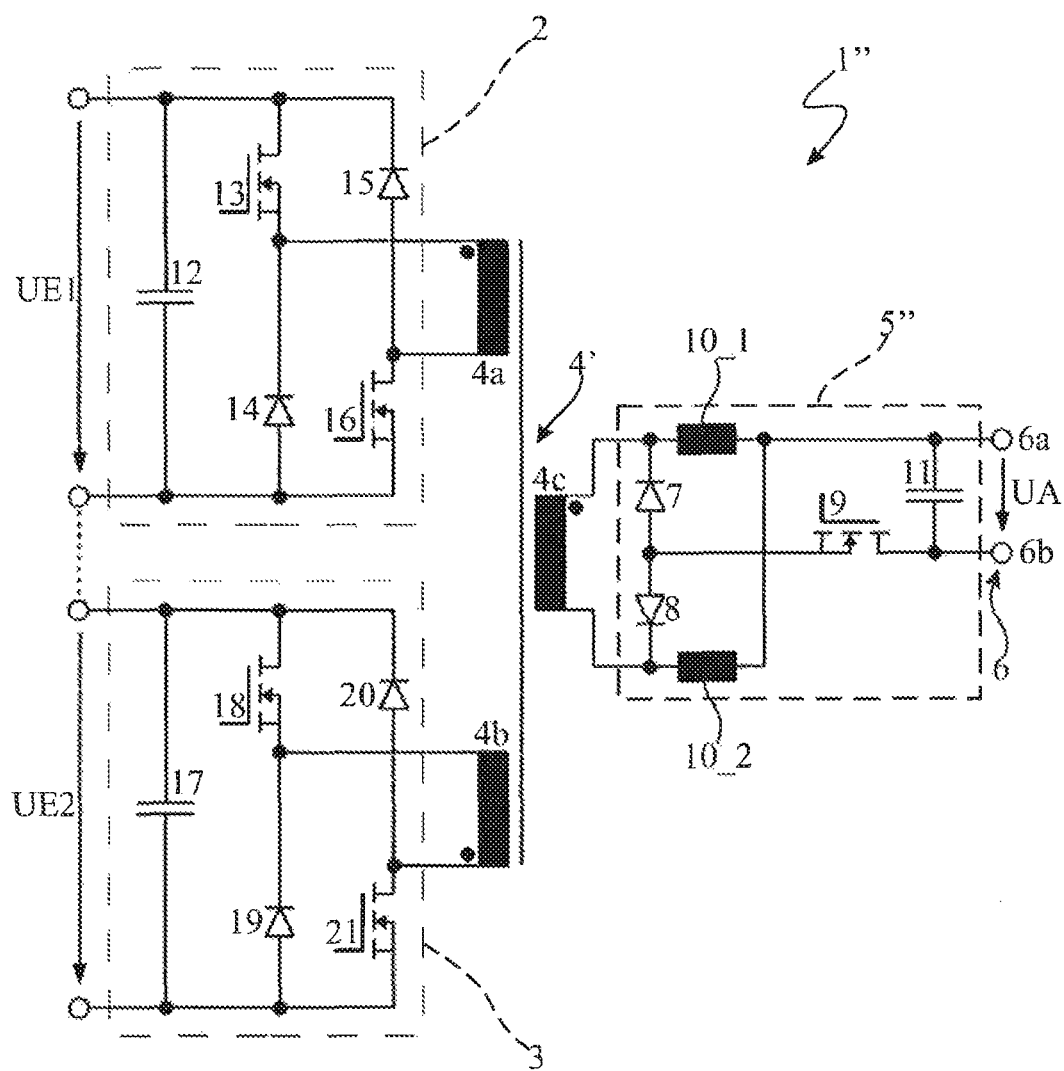
FIG. 3 shows a DC-DC converter in the form of a push-pull forward converter comprising two asymmetrical half-bridges connected in series or in parallel, a transformer comprising 2 primary windings and one secondary winding, a current doubler circuit and polarity reversal protection on the output side.

FIG. 3 shows a DC-DC converter 1" in the form of a push-pull forward converter comprising a transformer 4' comprising 2 primary windings 4a, 4b and one secondary winding 4c, a current doubler circuit and polarity reversal protection on the output side.

A rectifier circuit 5" comprises two rectifier elements in the form of a first diode 7 and a second diode 8, wherein a first terminal of the secondary winding 4c is electrically connected to the cathode of the first diode 7, the anode of the first diode 7 is electrically connected to the anode of the second diode 8, the cathode of the second diode 8 is electrically connected to a second terminal of the secondary winding 4c, and the drain-source path of the MOSFET polarity reversal protection transistor 9 is looped between the anodes of the first and second diodes 7, 8 and the second output terminal pole 6b of the output terminal 6.

A first inductor 10_1 is looped in between the first terminal of the secondary winding 4c and the first output terminal pole 6a of the output terminal 6, and a second inductor 10_2 is looped in between the second terminal of the secondary winding 4c and the first output terminal pole 6a of the output terminal.

Figure 4:
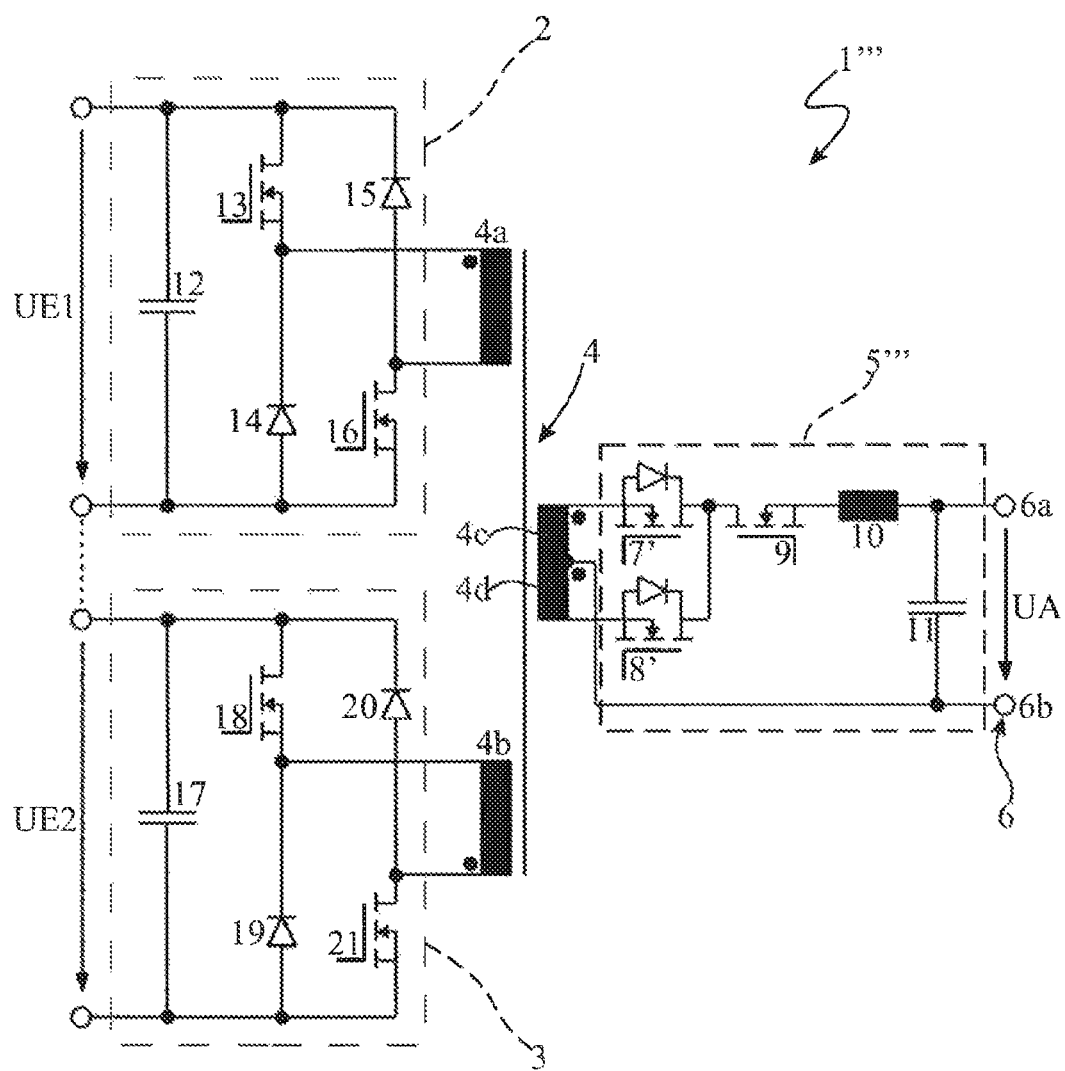
FIG. 4 shows a DC-DC converter based on the DC-DC converter shown in FIG. 1, with synchronous rectification on the secondary side/low-voltage side.

FIG. 4 shows a DC-DC converter 1'" based on the DC-DC converter 1 shown in FIG. 1, with synchronous rectification on the secondary side/low-voltage side. For this purpose, drivable switching means, for example transistors 7' and 8', are provided instead of the diodes 7 and 8.

It goes without saying that a suitable drive device (not shown) is provided for driving the switching means in all of the embodiments.

The invention is based firstly on a series or parallel connection of asymmetrical half-bridge converters. It is thus possible to use rapidly switching 600 V MOSFETs, such that a switching frequency can be increased to more than 100 kHz.

In the output circuit of the potential-isolating DC chopper with integrated polarity reversal protection, a power terminal of the polarity reversal protection transistor is directly connected to the anode or cathode terminals of the rectifier diodes.

On the secondary side, a current doubler arrangement is preferably not employed, but rather a split winding and push-pull rectification. This has structural advantages for the transformer design and results in a lower current loading of the windings.

The rectifier diodes can be followed directly by a MOSFET 9 as polarity reversal protection connected in series with the smoothing inductor 10. This initially appears to be unfavorable, since the current ripple as a result of the transistor 9 can produce additional losses. With regard to a realization, a solid busbar arrangement that is as short as possible can be used on account of the high currents.

The polarity reversal protection transistor 9 keeps transient voltage spikes away from an on-board electrical power supply system, for example, which gives reason to expect an increase in the reliability.

The invention claimed is:
1. A DC-DC converter, comprising:
a first asymmetrical half-bridge circuit,
a second asymmetrical half-bridge circuit,
a transformer comprising first and second primary windings and first and second secondary windings, wherein the first asymmetrical half-bridge circuit is configured to generate an AC voltage at the first primary winding, and wherein the second asymmetrical half-bridge circuit is configured to generate an AC voltage at the second primary winding, and
a rectifier circuit comprising
an output terminal, wherein the output terminal comprises a first output terminal pole and a second output terminal pole, and
two rectifier elements in the form of a first diode and a second diode,
wherein the rectifier circuit is configured to rectify voltages present at the first and second secondary windings and to output a rectified voltage at the output terminal,
wherein the rectifier circuit further comprises a polarity reversal protection transistor,
wherein a drain-source path of the polarity reversal protection transistor is directly electrically connected to a cathode of the first diode and to a cathode of the second diode, and
wherein the drain-source path of the polarity reversal protection transistor is looped in between the cathodes of the first and second diodes and the first output terminal pole or the second output terminal pole of the output terminal,
wherein a first terminal of the first secondary winding is electrically connected to an anode of the first diode, and the drain-source path of the polarity reversal protection transistor and an inductor are looped in between the cathode of the first diode and the first output terminal pole of the output terminal,
wherein a first terminal of the second secondary winding is electrically connected to an anode of the second diode,
wherein the cathode of the first diode and the cathode of the second diode are electrically connected,
wherein the second terminal of the first secondary winding, the second terminal of the second secondary winding and the second output terminal pole of the output terminal are electrically connected,
wherein a constant voltage is applied to a gate terminal of the polarity reversal protection transistor, such that the polarity reversal protection transistor blocks a polarity-reversed voltage at the output terminal, and
wherein the two rectifier elements and the polarity reversal protection transistor are integrated into a power module.
2. The DC-DC converter as claimed in claim 1, wherein MOSFETs are used as switches in the first and second asymmetrical half-bridge circuits.
3. The DC-DC converter as claimed in claim 1, wherein the constant voltage to be applied to the gate terminal of the polarity reversal protection transistor, such that the polarity reversal protection transistor blocks a polarity-reversed volt- age at the output terminal, is chosen depending on an interconnection of the polarity reversal protection transistor.

* * * * *